(12) United States Patent
Shibata et al.

(10) Patent No.: US 11,802,575 B2
(45) Date of Patent: Oct. 31, 2023

(54) VIBRATION/NOISE REDUCTION DEVICE, ELECTRIC COMPRESSOR INCLUDING THE VIBRATION/NOISE REDUCTION DEVICE, AND VIBRATION/NOISE REDUCTION METHOD

(71) Applicant: MITSUBISHI HEAVY INDUSTRIES ENGINE & TURBOCHARGER, LTD., Sagamihara (JP)

(72) Inventors: Naomichi Shibata, Sagamihara (JP); Michio Kyoya, Sagamihara (JP)

(73) Assignee: MITSUBISHI HEAVY INDUSTRIES ENGINE & TURBOCHARGER, LTD., Kanagawa (JP)

(*) Notice: Subject to any disclaimer, the term of this patent is extended or adjusted under 35 U.S.C. 154(b) by 93 days.

(21) Appl. No.: 17/420,800

(22) PCT Filed: Jan. 30, 2019

(86) PCT No.: PCT/JP2019/003162
§ 371 (c)(1),
(2) Date: Jul. 6, 2021

(87) PCT Pub. No.: WO2020/157858
PCT Pub. Date: Aug. 6, 2020

(65) Prior Publication Data
US 2022/0112904 A1    Apr. 14, 2022

(51) Int. Cl.
*F04D 29/66* (2006.01)
*F04D 25/06* (2006.01)
*H02P 23/04* (2006.01)

(52) U.S. Cl.
CPC ........... *F04D 29/668* (2013.01); *F04D 25/06* (2013.01); *H02P 23/04* (2013.01)

(58) Field of Classification Search
CPC ......... H02K 5/24; F04D 29/668; F04D 25/06; H02P 23/04; H02P 25/032
See application file for complete search history.

(56) References Cited

U.S. PATENT DOCUMENTS

2005/0231142 A1    10/2005  Yoshinaga et al.
2012/0251361 A1*   10/2012  Yokoi ..................... F04C 29/06
                                                         417/423.7
(Continued)

FOREIGN PATENT DOCUMENTS

CN    103649545 A    3/2014
JP    2004-117586 A  4/2004
(Continued)

OTHER PUBLICATIONS

Atsuyuki, Motor Drive Controller . . . (Machine Translation)—'JP2004117586A_MT.pdf', Apr. 2004 (Year: 2004).*
(Continued)

*Primary Examiner* — Kenneth J Hansen
(74) *Attorney, Agent, or Firm* — BIRCH, STEWART, KOLASCH & BIRCH, LLP

(57) ABSTRACT

With an electric compressor including a rotational shaft, a compressor wheel disposed on the rotational shaft, and an electric motor for applying a rotational force to the rotational shaft including a rotor fixed to the rotational shaft, and a stator disposed around the rotor, for applying the rotational force to the rotor by an electromagnetic force, a vibration/noise reduction device includes a detector for detecting a frequency related to a vibration of the stator, and a signal generator for generating a vibration signal that has a frequency of a predetermined integral multiple of an electrical angle frequency, which is obtained from the frequency detected by the detector, and has a signal wave attenuating
(Continued)

the vibration of the stator, and a vibrator for vibrating the electric compressor based on the vibration signal.

11 Claims, 12 Drawing Sheets

(56) References Cited

U.S. PATENT DOCUMENTS

| | | | | |
|---|---|---|---|---|
| 2013/0108486 A1* | 5/2013 | Suitou | ................. | H02K 11/33 |
| | | | | 417/410.1 |
| 2014/0090626 A1 | 4/2014 | An et al. | | |
| 2016/0090987 A1* | 3/2016 | Yamashita | ............ | F04B 39/121 |
| | | | | 417/410.5 |

FOREIGN PATENT DOCUMENTS

| | | |
|---|---|---|
| JP | 2005-304238 A | 10/2005 |
| JP | 2006-166554 A | 6/2006 |
| JP | 2014-217215 A | 11/2014 |
| JP | 2015-151895 A | 8/2015 |
| JP | 2017-26282 A | 2/2017 |
| WO | WO 2013/011839 A1 | 1/2013 |
| WO | WO 2013/118421 A1 | 8/2013 |

OTHER PUBLICATIONS

International Preliminary Report on Patentability and Written Opinion of the International Searching Authority, with an English translation, dated Aug. 12, 2021, for International No. PCT/JP2019/003162.
International Search Report, dated May 7, 2019, for International Application No. PCT/JP2019/003162 with an English translation.
Office Action dated Feb. 21, 2023 issued in counterpart Japanese Application No. 2020-569231 with an Englsh Translation.
Chinese Office Action and Search Report for corresponding Chinese Application No. 201980089508.4 dated Jul. 14, 2023.

* cited by examiner

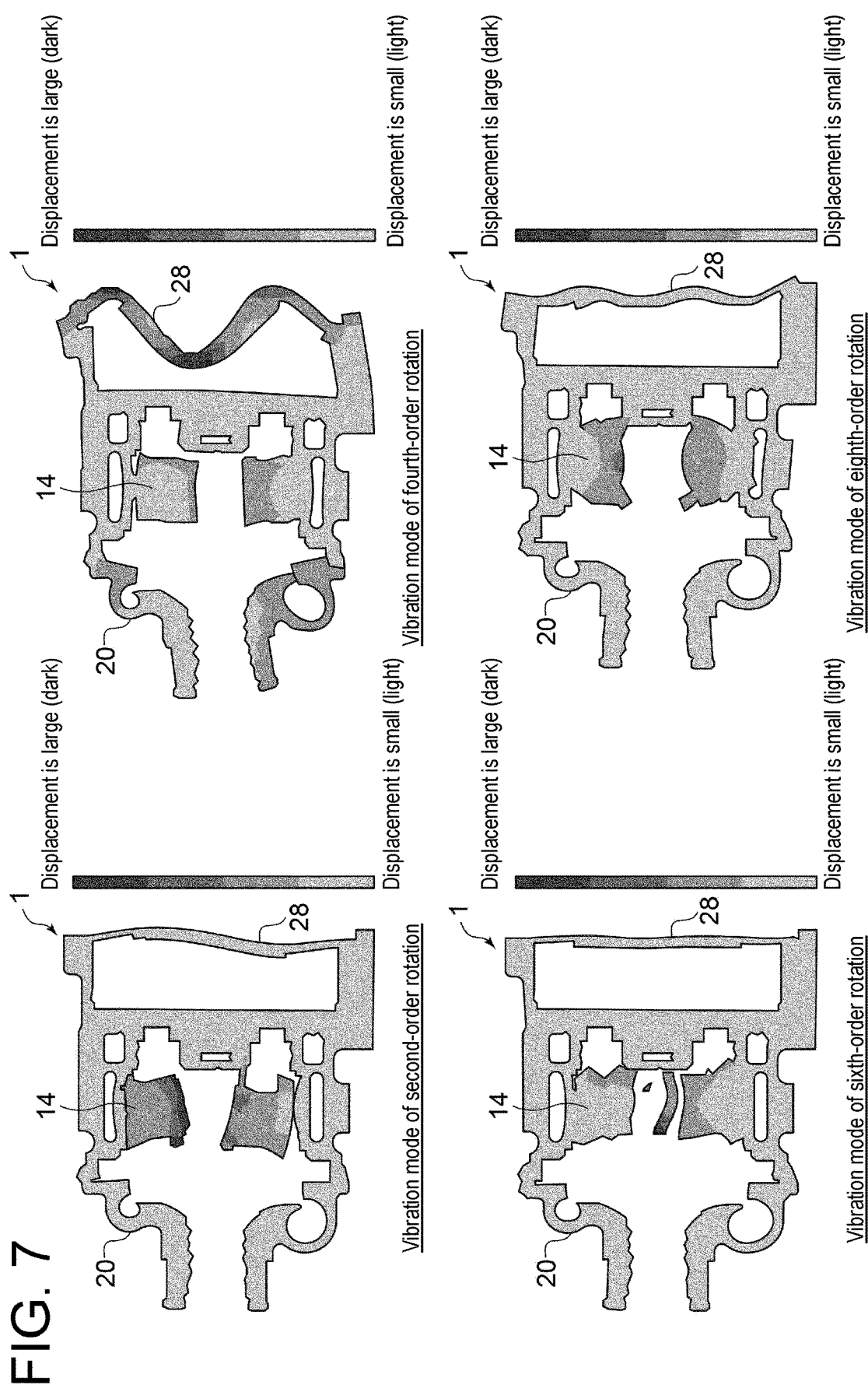

VIBRATION/NOISE REDUCTION DEVICE, ELECTRIC COMPRESSOR INCLUDING THE VIBRATION/NOISE REDUCTION DEVICE, AND VIBRATION/NOISE REDUCTION METHOD

TECHNICAL FIELD

The present disclosure relates to a vibration/noise reduction device, an electric compressor including the vibration/noise reduction device, and a vibration/noise reduction method.

BACKGROUND

It is desirable to reduce a vibration/noise caused during an operation of an electric compressor. The vibration/noise includes not only a vibration/noise caused by a rotation of a compressor wheel, but also a vibration/noise caused by a vibration of a stator of an electric motor.

According to the findings of the present inventors, it is apparent that, as the vibration/noise caused in the electric compressor, the vibration/noise arising from the vibration of the stator of the electric motor is more dominant. Thus, in order to reduce the vibration/noise of the electric compressor, it is effective to reduce the vibration/noise arising from the vibration of the stator of the electric motor.

In this regard, Patent Document 1 discloses a technique of, in an electric motor used as a driving source for vehicle propulsion, reducing a vibration/noise of the electric motor by installing a damping member between a stator disposed around a rotor of the electric motor and a housing for housing the stator, in order to reduce the vibration/noise of the electric motor.

CITATION LIST

Patent Literature

Patent Document 1: JP2006-166554A

SUMMARY

Technical Problem

However, if the damping member is installed between the housing and the stator of the electric motor as in Patent Document 1 in order to reduce the vibration of the stator, it is difficult to transmit heat generated by the stator to the housing, which may hinder promotion of cooling (heat exchange) of the stator. As a result, heat may be transmitted to a bearing and the like having low heat resistance.

The present invention was made in view of the above, and an object of the present invention is to provide a vibration/noise reduction device for reducing a vibration/noise of an electric compressor without impairing coolability of a stator, an electric compressor including the vibration/noise reduction device, and a vibration/noise reduction method.

Solution to Problem (1) A vibration/noise reduction device according to at least one embodiment of the present invention is a vibration/noise reduction device for reducing a vibration or noise of an electric compressor, the electric compressor including a rotational shaft, a compressor wheel disposed on the rotational shaft, an electric motor for applying a rotational force to the rotational shaft, the electric motor including, a rotor fixed to the rotational shaft, and a stator disposed around the rotor, for applying the rotational force to the rotor by an electromagnetic force, the vibration/noise reduction device including a detector for detecting a frequency related to a vibration of the stator, and a signal generator for generating a vibration signal that has a frequency of a predetermined integral multiple of an electrical angle frequency, which is obtained from the frequency detected by the detector, and has a signal wave attenuating the vibration of the stator.

With the above configuration (1), the electric compressor is applied with the vibration on the basis of the vibration signal that is the predetermined integral multiple of the electrical angle frequency, which is obtained from the frequency related to the vibration of the stator, and has the signal wave attenuating the vibration of the stator. Thus, it is possible to cancel the vibration/noise of the electric compressor arising from the vibration of the stator by the vibration on the basis of the vibration signal, and to reduce the vibration/noise of the electric compressor. Therefore, it is no longer necessary to dispose a damping member for suppressing the vibration of the stator of the electric motor between the stator and the housing as before, or it is possible to reduce the thickness of the damping member to increase the capacity of heat generated by the stator to be transmitted to the housing. Accordingly, it is possible to reduce the vibration/noise of the electric compressor without impairing coolability of the stator.

(2) In some embodiments, in the above configuration (1), the electric compressor further includes a motor housing for housing the electric motor, and an inverter for controlling an electrical frequency of an alternating current supplied to the stator, and the inverter is housed in an inverter housing space formed inside the motor housing.

With the above configuration (2), also in the structure where the electric motor and the inverter are housed inside the motor housing, it is possible to reduce the vibration/noise of the electric compressor based on the principle described in the above configuration (1).

(3) In some embodiments, in the above configuration (1), the electric compressor further includes a motor housing for housing the electric motor, an inverter for controlling an electrical frequency of an alternating current supplied to the stator, and an inverter housing internally having an inverter housing space for housing the inverter, and the inverter housing is coupled to the motor housing via an elastic member.

With the above configuration (3), also in the structure where the motor housing for housing the electric motor and the inverter housing for housing the inverter are coupled via the elastic member (so-called edge cutting structure), it is possible to reduce the vibration/noise of the electric compressor based on the principle described in the above configuration (1).

(4) In some embodiments, in the above configuration (2) or (3), the electric compressor further includes a lid member for covering an opening of the inverter housing space, and the vibrator is disposed on the lid member.

In general, the lid member of the electric compressor has a relatively small thickness compared to the other members forming the electric compressor, and causes a large vibration/noise. With the above configuration (4), since the vibrator is disposed on the lid member causing the large vibration/noise, it is possible to effectively reduce the vibration/noise of the electric compressor based on the principle described in the above configuration (1).

(5) In some embodiments, in any one of the above configurations (2) to (4), the vibrator is disposed in the inverter housing space.

With the above configuration (5), it is possible to protect the vibrator from external water, dirt, and the like. In addition, since the vibrator is disposed in the inverter housing space, a space where the vibrator is disposed outside the electric compressor is no longer needed.

(6) In some embodiments, in any one of the above configurations (2) to (5), the signal generator is disposed in the inverter housing space where the inverter is housed.

With the above configuration (6), it is possible to protect the signal generator from external water, dirt, and the like. In addition, it is possible to simplify wiring between the signal generator and the vibrator, if the vibrator is disposed in the inverter housing space.

(7) In some embodiments, in any one of the above configurations (1) to (6), the electric compressor further includes an inverter for controlling an electrical frequency of an alternating current supplied to the stator, and the detector is configured to detect the frequency related to the vibration of the stator, based on the electrical frequency of the alternating current supplied to the stator.

According to the findings of the present inventors, it is apparent that the stator of the electric motor vibrates at a frequency according to the electrical frequency of the alternating current supplied to the stator. With the above configuration (7), since the frequency related to the vibration of the stator is detected based on the electrical frequency of the alternating current supplied to the stator, it is possible to grasp the frequency related to the vibration of the stator even before the vibration/noise arising from the vibration of the stator is actually caused. Thus, it is possible to reduce the vibration/noise of the electric compressor more quickly than in a case where the vibration/noise arising from the vibration of the stator is detected by using a vibration sensor or a noise sensor.

(8) In some embodiments, in the above configuration (7), the detector includes a frequency measurement instrument for measuring the electrical frequency of the alternating current supplied to the stator.

With the above configuration (8), since the electric compressor is vibrated based on the vibration signal which is generated from the electrical frequency of the alternating current supplied to the stator, it is possible to reduce the vibration/noise of the electric compressor arising from the vibration of the stator.

(9) In some embodiments, in the above configuration (7), the detector includes a command value acquisition instrument for acquiring a command value regarding the electrical frequency of the alternating current input to the inverter.

With the above configuration (9), acquiring the command value regarding the electrical frequency of the alternating current input to the inverter, it is possible to detect the frequency related to the vibration of the stator even before the alternating current is generated in accordance with the command value in the inverter. Therefore, it is possible to quickly detect the frequency related to the vibration of the stator, compared to the above configuration (8).

(10) In some embodiments, in any one of the above configurations (1) to (9), the detector includes a vibration sensor configured to detect a frequency of a vibration of the electric compressor.

With the above configuration (10), since the frequency of the vibration of the electric compressor is detected, and the detected vibration of the electric compressor is canceled based on the principle described in the above configuration (1), it is possible to reduce the vibration/noise of the electric compressor.

(11) In some embodiments, in any one of the above configurations (1) to (10), the detector includes a noise sensor configured to detect a frequency of noise caused by the electric compressor.

With the above configuration (11), since the frequency of the noise caused by the electric compressor is detected, and the detected noise of the electric compressor is canceled based on the principle described in the above configuration (1), it is possible to reduce the vibration/noise of the electric compressor.

(12) In some embodiments, in any one of the above configurations (1) to (11), the vibration signal has a signal wave which is an opposite phase to the vibration of the stator.

With the above configuration (12), it is possible to cancel the vibration/noise of the electric compressor arising from the vibration of the stator by the vibration on the basis of the vibration signal, and to reduce the vibration/noise of the electric compressor.

(13) An electric compressor according to at least one embodiment of the present invention includes a rotational shaft, a compressor wheel disposed on the rotational shaft, an electric motor for applying a rotational force to the rotational shaft, the electric motor including a rotor fixed to the rotational shaft, and a stator disposed around the rotor, for applying the rotational force to the rotor by an electromagnetic force, and the vibration/noise reduction device according to any one of the above configurations (1) to (12).

With the above configuration (13), it is possible to provide the electric compressor where the vibration/noise is reduced based on the principle described in the above configuration (1).

(14) A vibration/noise reduction method according to at least one embodiment of the present invention is a vibration/noise reduction method for reducing a vibration or noise of an electric compressor, the electric compressor including a rotational shaft, a compressor wheel disposed on the rotational shaft, an electric motor for applying a rotational force to the rotational shaft, the electric motor including a rotor fixed to the rotational shaft, and a stator disposed around the rotor, for applying the rotational force to the rotor by an electromagnetic force, the vibration/noise reduction method including a step of detecting a frequency related to a vibration of the stator, a step of generating a vibration signal that has a frequency of a predetermined integral multiple of an electrical angle frequency obtained from the frequency and has a signal wave attenuating the vibration of the stator, and a step of vibrating the electric compressor based on the vibration signal.

With the above method (14), the electric compressor is applied with the vibration on the basis of the vibration signal that is the predetermined integral multiple of the electrical angle frequency, which is obtained from the frequency related to the vibration of the stator, and has the signal wave attenuating the vibration of the stator. Thus, it is possible to cancel the vibration/noise arising from the vibration of the stator by the vibration on the basis of the vibration signal, and to reduce the vibration/noise of the electric compressor. Therefore, it is no longer necessary to dispose a damping member for suppressing the vibration of the stator of the electric motor between the stator and the housing as before, or it is possible to reduce the thickness of the damping member to increase the capacity of heat generated by the stator to be transmitted to the housing. Accordingly, it is possible to reduce the vibration/noise of the electric compressor without impairing coolability of the stator.

(15) In some embodiments, in the above method (14), the step of detecting the frequency includes detecting the frequency based on an electrical frequency of an alternating current supplied to the stator.

According to the findings of the present inventors, it is apparent that the stator of the electric motor vibrates at a frequency according to the electrical frequency of the alternating current supplied to the stator. With the above method (15), since the frequency related to the vibration of the stator is detected based on the electrical frequency of the alternating current supplied to the stator, it is possible to grasp the frequency related to the vibration of the stator even before the vibration/noise arising from the vibration of the stator is caused. Therefore, it is possible to reduce the vibration/noise of the electric compressor more quickly than in a case where the vibration/noise arising from the vibration of the stator is detected by using a vibration sensor or a noise sensor.

Advantageous Effects

According to some embodiments of the present invention, it is possible to reduce a vibration/noise of an electric compressor without impairing coolability of a stator.

BRIEF DESCRIPTION OF DRAWINGS

FIG. 7 shows analysis diagrams obtained by performing electromagnetic field response analysis on the electric compressor according to an embodiment of the present invention.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

<Overall Configuration of Electric Compressor>

Figure 1:
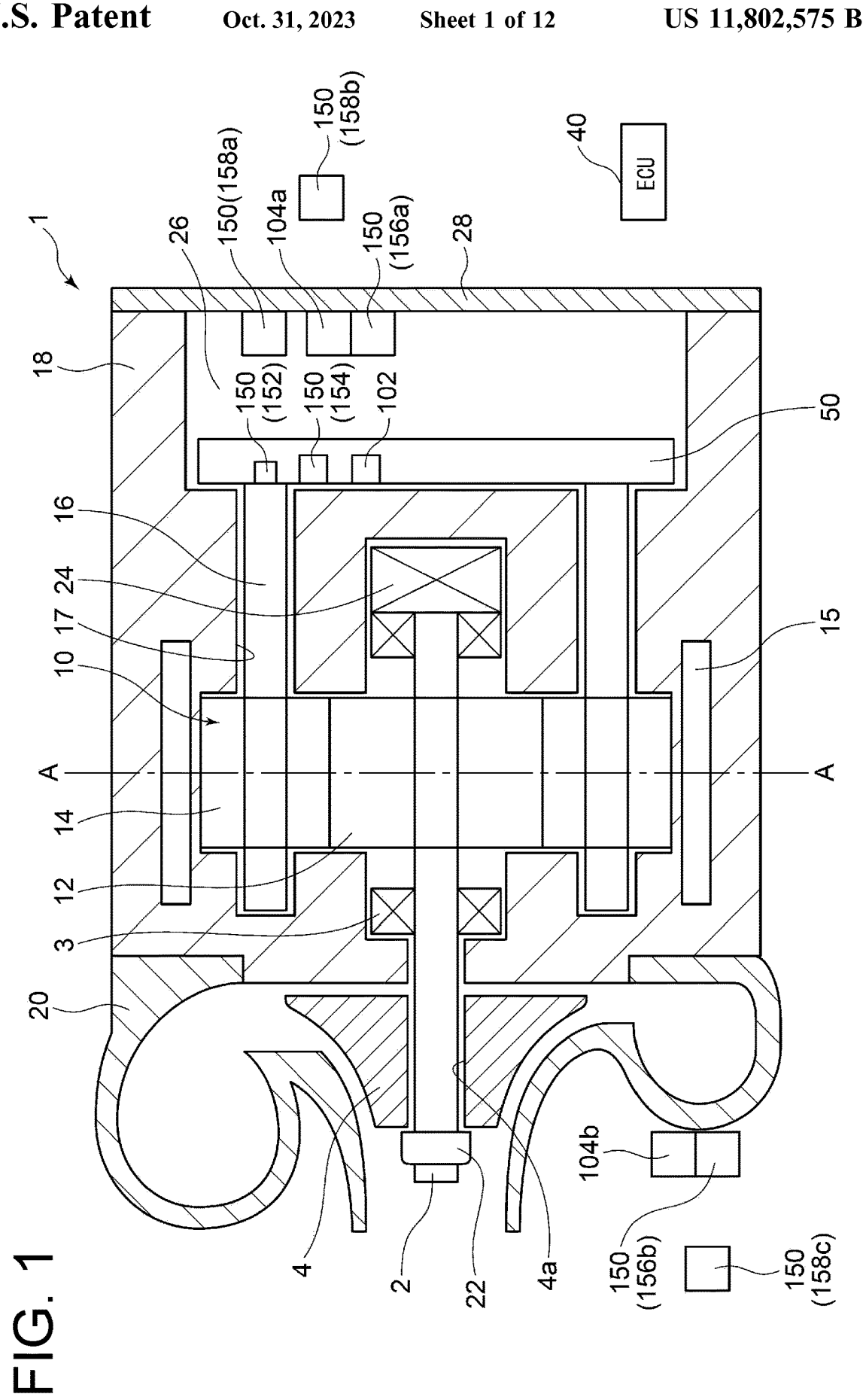
FIG. 1 is a schematic configuration view of an electric compressor according to an embodiment of the present invention.
Figure 2:
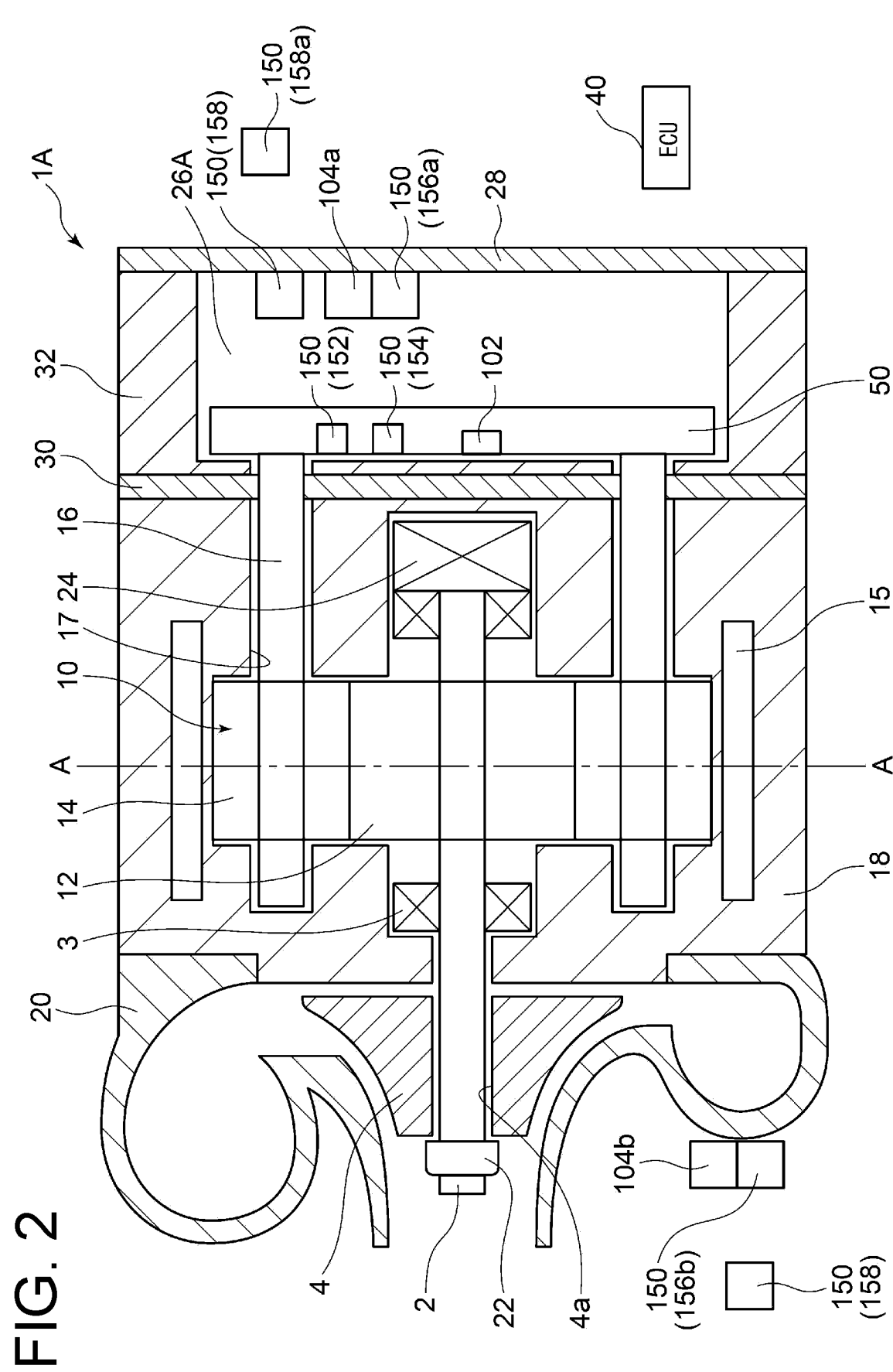
FIG. 2 is a schematic configuration view of an electric compressor according to another embodiment of the present invention.
Figure 3:
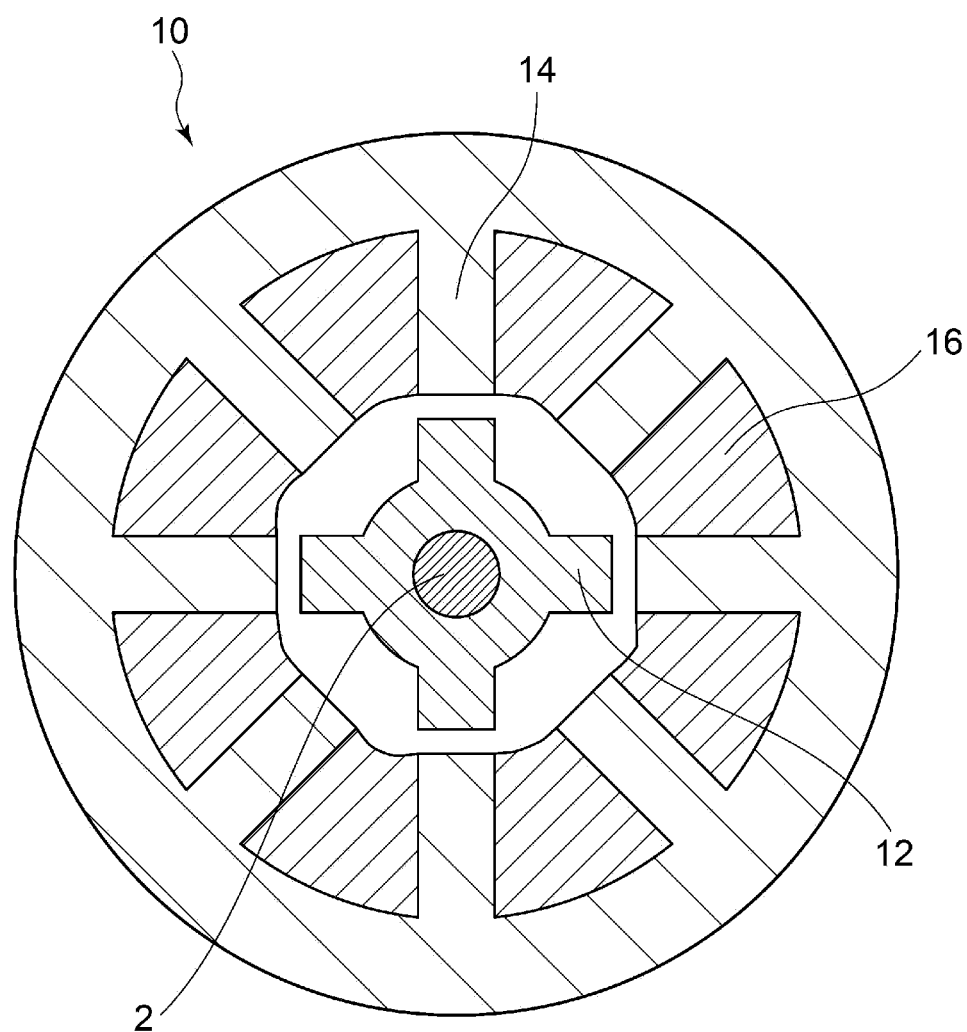
FIG. 3 is a cross-sectional view taken along line A-A of the electric motor shown in FIGS. 1 and 2.
Figure 4:
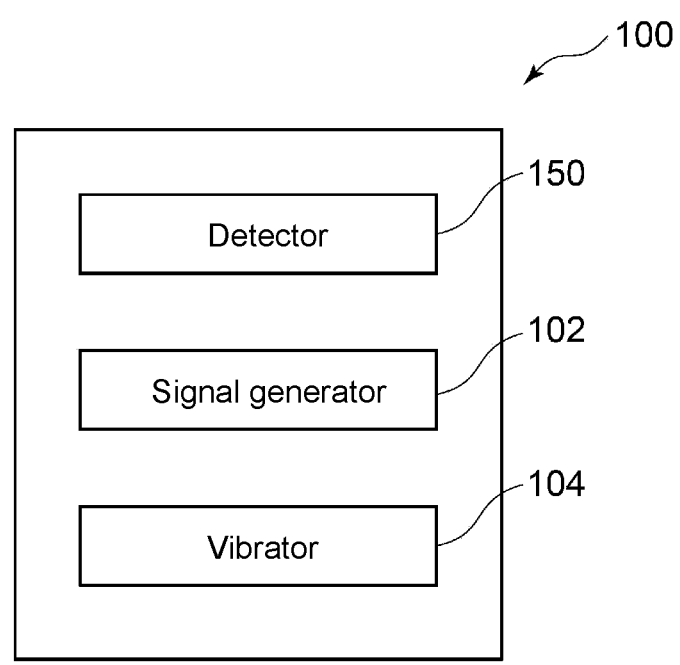
FIG. 4 is a block diagram showing the configuration of a vibration/noise reduction device according to an embodiment of the present invention.
Figure 5:
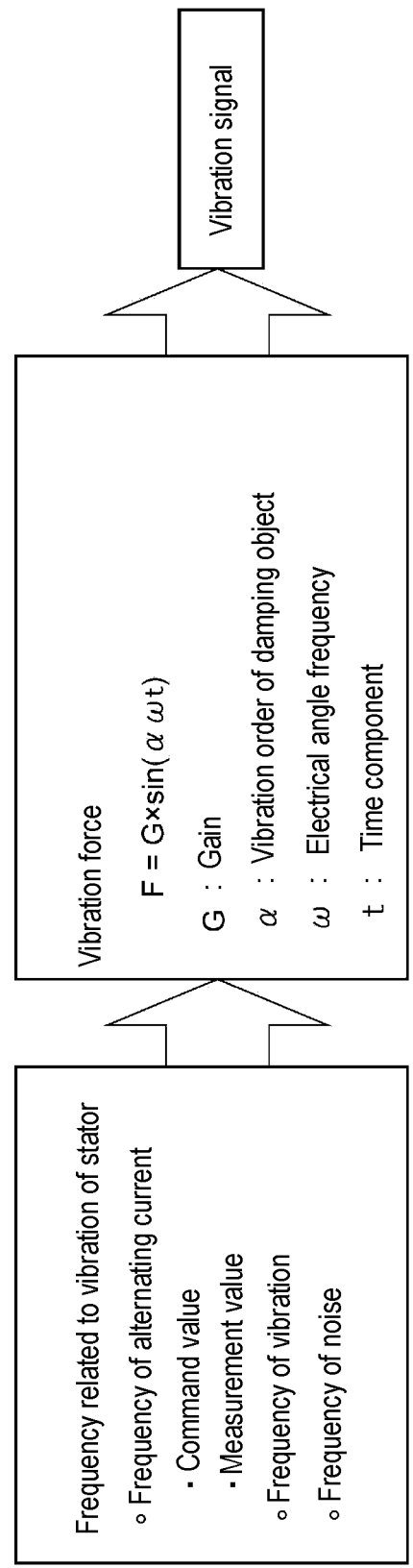
FIG. 5 is a diagram for describing a flow in which a signal generator generates a vibration signal according to an embodiment of the present invention.
Figure 6:
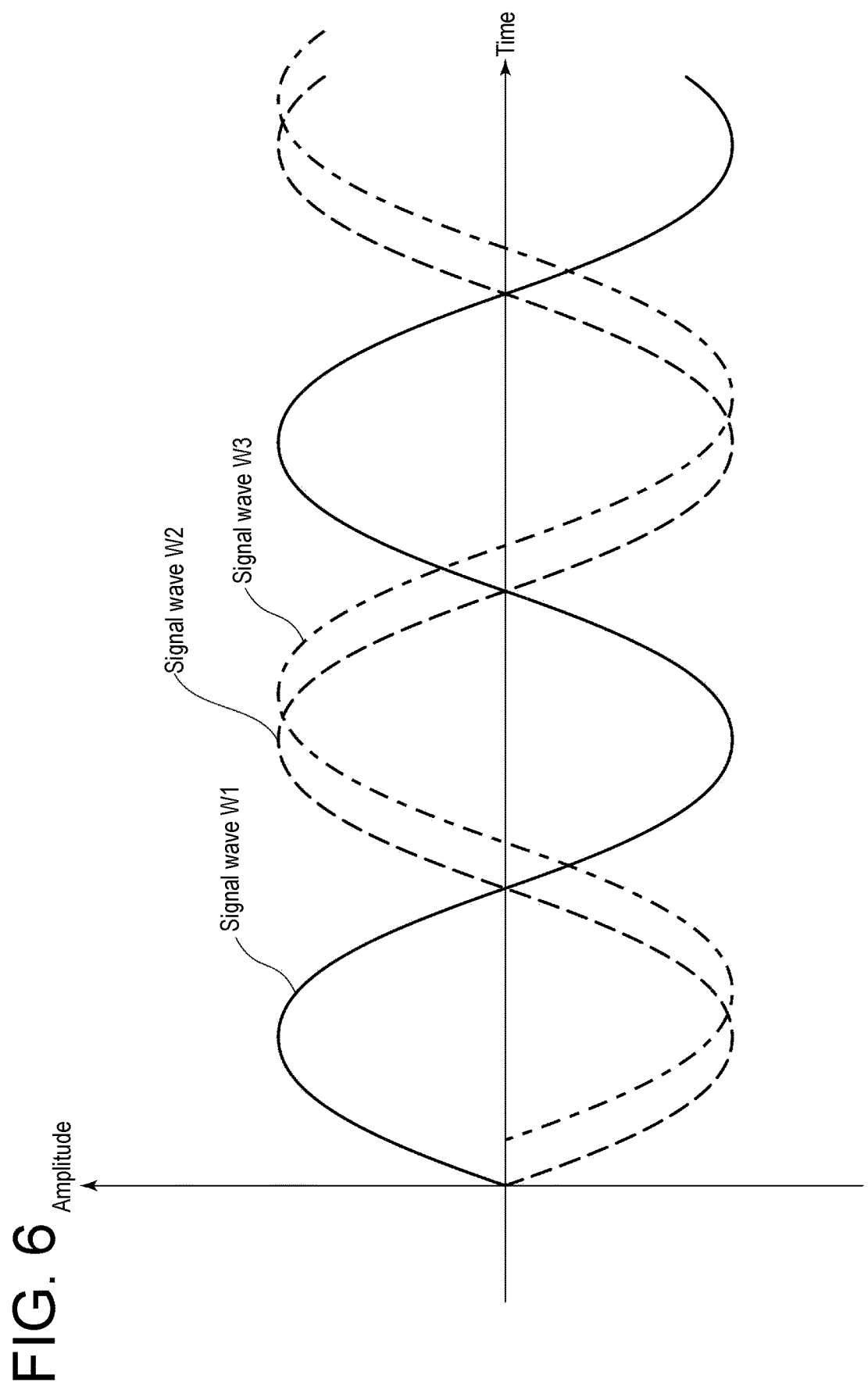
FIG. 6 is a chart for describing the vibration signal generated by the signal generator according to an embodiment of the present invention.

FIG. 1 is a schematic configuration view of an electric compressor according to an embodiment of the present invention. FIG. 2 is a schematic configuration view of an electric compressor according to another embodiment of the present invention. FIG. 3 is a cross-sectional view taken along line A-A of the electric motor shown in FIGS. 1 and 2. FIG. 4 is a block diagram showing the configuration of a vibration/noise reduction device according to an embodiment of the present invention. FIG. 5 is a functional block diagram showing a flow in which a signal generator generates a vibration signal according to an embodiment of the present invention. FIG. 6 is a chart for describing the vibration signal generated by the signal generator according to an embodiment of the present invention.

As shown in FIGS. 1 and 2, an electric compressor 1, 1A includes a rotational shaft 2, a compressor wheel 4 disposed on the rotational shaft 2, and an electric motor 10 for applying a rotational force to the rotational shaft 2.

The rotational shaft 2 is supported rotatably by a bearing 3, and has one end where the compressor wheel 4 is disposed. The rotational shaft 2 is inserted through a hole 4a formed in the compressor wheel 4, and is fixed to the compressor wheel 4 by a nut 22. At another end of the rotational shaft 2, a precompression application member 24 for preventing swing of the rotational shaft 2 is disposed.

The compressor wheel 4 is housed in a compressor housing 20. The compressor wheel 4 is configured to rotate with the rotational shaft 2 when the electric motor 10 applies the rotational force to the rotational shaft 2, and to compress air.

The configuration of the electric motor 10 will be described with reference to FIG. 3. As shown in FIG. 3, the electric motor 10 includes a rotor 12 fixed to the rotational shaft 2, and stators 14 disposed separately from each other around the rotor 12, for applying the rotational force to the rotor 12 by an electromagnetic force. In the illustrated embodiment, the electric motor 10 is configured as a four-pole motor. The stators 14 are each wound with a stator coil 16. Passing an alternating current through the stator coil 16, the stator 14 is applied with a voltage (exciting voltage) and generates a magnetic field. The rotor 12 is, for example, a permanent magnet and is configured to rotate by the magnetic field generated by the stator 14.

Referring back to FIGS. 1 and 2, the configuration of the electric compressor 1, 1A will be described. As shown in FIGS. 1 and 2, the electric compressor 1, 1A may further include a motor housing 18 where a motor housing space 17 for housing the electric motor 10 is formed. In the embodiments shown in FIGS. 1 and 2, respectively, the motor housing 18 houses the electric motor 10 in the motor housing space 17 to be in contact with an outer peripheral surface of the stator 14 of the electric motor 10. Moreover, the motor housing 18 is connected to the above-described compressor housing 20 on a side opposite to an inverter housing space 26 to be described later. Further, in the motor housing 18, a cooling passage 15, where a cooling medium such as cooling water flows, may be formed.

In addition, the electric compressor 1, 1A further includes an inverter 50 connected to the stator coil 16, for controlling an electrical frequency of the alternating current supplied to the stator 14 (the current passing through the stator coil 16). The inverter 50 receives a command value (armature current command value) regarding an electrical frequency of an alternating current which is output from an ECU 40 installed outside the electric compressor 1, 1A, and converts a direct current into an alternating current based on the received armature current command value. The armature current command value may be decided based on an armature current command value map (not shown) preset in the ECU 40, when the electric compressor 1, 1A is disposed in a vehicle, for example. The armature current command value map is a map where the armature current command value is associated with a demand torque, and inputting the demand torque to the map, the armature current command value corresponding thereto is output. The armature current command value may include a command value regarding a current value of the alternating current, in addition to the command value regarding the electrical frequency of the alternating current.

In the embodiment shown in FIG. 1, the inverter 50 is housed in the inverter housing space 26 formed inside the motor housing 18. The inverter housing space 26 is formed inside the motor housing 18 as another space different from the motor housing space 17. That is, in the embodiment shown in FIG. 1, unlike the embodiment shown in FIG. 2, the motor housing space 17 for housing the electric motor 10 and the inverter housing space 26 for housing the inverter 50 are formed separately from each other inside the same housing (motor housing 18).

On the other hand, in the embodiment shown in FIG. 2, the inverter 50 is housed in an inverter housing space 26A formed inside an inverter housing 32. The inverter housing 32 is coupled to the motor housing 18 to be located opposite to the compressor housing 20 across the motor housing 18. The inverter housing 32 is coupled to the motor housing 18 via an elastic member 30 formed by an elastic material such as a synthetic resin. That is, in the embodiment shown in FIG. 2, unlike the embodiment shown in FIG. 1, the housing (motor housing 18), where the motor housing space 17 for housing the electric motor 10 is formed, and the housing (inverter housing 32), where the inverter housing space 26A for housing the inverter 50 is formed, are configured separately from each other. With the configuration of the electric compressor 1A shown in FIG. 2, since the inverter housing 32 is coupled to the motor housing 18 via the elastic member 30, the vibration of the stator 14 is less transmitted to a lid member 28 to be described later.

Meanwhile, according to the findings of the present inventors, it is apparent that, as a vibration/noise caused in the electric compressor 1, 1A, a vibration/noise arising from the vibration of the stator 14 is dominant. The vibration of the stator 14 is caused by a periodic change in magnetic attractive force associated with the rotation of the rotor 12. Moreover, upon the stator coil 16 is energized, Joule heat is generated in the stator 14. If the stator 14 is heated, heat is transmitted to the surroundings, which may have a negative effect on the bearing 3 and the inverter 50. Thus, it is necessary to cool the stator 14. Hereinafter, a vibration/noise reduction device 100 for reducing the vibration/noise of the electric compressor 1, 1A without impairing coolability of the stator 14 will be described.

As shown in FIG. 4, the vibration/noise reduction device according to an embodiment of the present invention includes a detector 150, a signal generator 102, and a vibrator 104.

The detector 150 detects a frequency related to the vibration of the stator 14. The "frequency related to the vibration of the stator" includes not only a frequency of the vibration itself of the stator 14, but also frequencies other than the vibration of the stator 14 (such as the electrical frequency of the alternating current supplied to the stator 14, a frequency of the vibration in the electric compressor 1, 1A, and a frequency of the noise caused by the electric compressor 1, 1A to be described later) capable of deriving the frequency of the vibration itself of the stator 14.

The signal generator 102 generates a vibration signal that has a frequency of a predetermined integral multiple of an electrical angle frequency ω, which is obtained by performing a predetermined process on the frequency detected by the detector 150, and has a signal wave attenuating the vibration of the stator 14. The "electrical angle frequency ω" here is a frequency of the vibration itself of the stator 14 caused by the periodic change in magnetic attractive force associated with the rotation of the rotor 12. The vibration signal will be described later.

Next, the flow in which the signal generator 102 generates the vibration signal will be described with reference to FIG. 5. As shown in FIG. 5, in order to generate the vibration signal, the signal generator 102 acquires the frequency which is related to the vibration of the stator 14 detected by the detector 150. Then, the signal generator 102 calculates a vibration force F to be applied to the electric compressor 1, 1A by using:

$$F = G \times \sin(\alpha \omega t) \quad (1)$$

where F is the vibration force, G is a magnitude of a gain, α is a vibration order of a damping object, ω is the electrical angle frequency, and t is a time component. G is a parameter corresponding to the magnitude of the vibration force in the vibration signal. It may be configured such that G receives a value of a gain pre-adjusted to cancel a vibration/noise caused in a possible operation condition, or a value of a gain which is optimum for canceling a variation/noise changing in accordance with an actual operation condition is calculated constantly, and G receives the calculated value. α is a predetermined integer value that can be calculated by performing eigenvalue analysis or the like on the electric compressor 1, 1A.

Next, the vibration signal generated by the signal generator 102 will be described with reference to FIG. 6. In FIG. 6, the abscissa indicates a time, and the ordinate indicates the magnitude of an amplitude. A signal wave W1 indicated by a solid line is a wave having a frequency of a predetermined integral multiple of the electrical angle frequency ω, and a signal wave W2 indicated by a dotted line is a wave having an opposite phase to the signal wave W1. In addition, a signal wave W3 indicated by a single-dotted chain line is a wave with a phase shifted by a phase difference A relative to the signal wave W2.

As shown in FIG. 6, the signal generator 102 generates a vibration signal that has the frequency of the predetermined integral multiple of the electrical angle frequency ω and has the signal wave (W2, W3) attenuating the vibration of the stator 14. The signal wave W2 is the wave having the opposite phase to the vibration of the stator 14, and the signal wave W3 is the wave with the phase shifted by the phase difference A relative to the signal wave W2. It is only necessary that the phase difference A falls within a range, where an effect of reducing the vibration/noise of the electric compressor 1, 1A is obtained, and more specifically, a range (phase adjustment range) of $-\pi/4 < \Delta < \pi/4$, if the electric compressor 1, 1A is vibrated by the vibrator 104 to be described later.

The vibrator 104 is configured to vibrate the electric compressor 1, 1A based on the vibration signal generated by the signal generator 102. A device to be used as the vibrator 104 is not particularly limited, as long as the device can periodically vibrate the electric compressor 1, 1A. It is possible to use, for example, a damping device for generating a periodical vibration by an electromagnetic force or a damping device for generating a periodical vibration by a piezoelectric element.

In view of the foregoing, with the configuration of the vibration/noise reduction device 100 according to an embodiment of the present invention, the electric compressor 1, 1A is applied with the vibration on the basis of the vibration signal which is the predetermined integral multiple of the electrical angle frequency ω obtained from the frequency related to the vibration of the stator 14 and has the signal wave attenuating the vibration of the stator 14. Thus, it is possible to cancel the vibration/noise arising from the vibration of the stator 14 by the vibration on the basis of the vibration signal, and to reduce the vibration/noise of the electric compressor 1, 1A. Therefore, it is no longer necessary to dispose the damping member for suppressing the vibration of the stator 14 of the electric motor 10 between the stator 14 and the motor housing 18 as before, or it is possible to reduce the thickness of the damping member to increase the capacity of heat generated by the stator 14 to be transmitted to the motor housing 18. Accordingly, it is possible to reduce the vibration/noise of the electric compressor 1, 1A without impairing coolability of the stator 14.

Moreover, with the configuration of the electric compressor 1, 1A shown in FIGS. 1 and 2, since the electric compressor 1, 1A includes the vibration/noise reduction device 100, it is possible to provide the electric compressor 1, 1A with the reduced vibration/noise.

Further, with the configuration of the electric compressor 1 shown in FIG. 1, also in the structure where the electric motor 10 and the inverter 50 are housed inside the motor housing 18, it is possible to reduce the vibration/noise of the electric compressor 1. Furthermore, with the configuration of the electric compressor 1A shown in FIG. 2, also in the structure where the motor housing 18 for housing the electric motor 10 and the inverter housing 32 for housing the inverter 50 are coupled via the elastic member 30 (so-called edge cutting structure), it is possible to reduce the vibration/noise of the electric compressor 1A.

In some embodiments, as shown in FIGS. 1 and 2, the electric compressor 1, 1A further includes a lid member 28 for covering an opening of the inverter housing space 26, 26A. Then, the vibrator 104 includes a first vibrator 104a disposed on the lid member 28.

The lid member 28 has a planar shape and is designed to have a small thickness (axial length of the rotational shaft 2 in the embodiments shown in FIGS. 1 and 2, respectively) such that the overall dimension of the electric compressor 1, 1A is small. The lid member 28 covers the opening of the inverter housing space 26, 26A, and thus the inverter housing space 26, 26A is a closed space.

FIG. 7 shows analysis diagrams obtained by performing electromagnetic field response analysis on the electric compressor according to an embodiment of the present invention. FIG. 7 shows the analysis diagrams where the vibration orders are second-order, fourth-order, sixth-order, eighth-order rotations, respectively. Moreover, FIG. 7 represents displacement in the electric compressor 1, 1A caused by the vibration of the stator 14 by shading, and the displacement caused by the vibration of the stator 14 increases as a color is darker.

As a result of analyzing a vibration mode of the electric compressor 1, as shown in FIG. 7, among vibrations transmitted from the stator 14 and caused in the lid member 28, a vibration component of the fourth-order rotation is larger than vibration components of the other vibration modes. Therefore, when the first vibrator 104a is disposed on the lid member 28, having the vibration mode of the fourth-order rotation as a damping object, it is possible to effectively reduce the vibration/noise of the lid member 28. Moreover, among vibrations transmitted from the stator 14 and caused in the compressor housing 20, a vibration component of the second-order rotation is larger than the vibration components of other vibration modes. Therefore, when a second vibrator 104b is disposed on the compressor housing 20, having the vibration mode of the second-order rotation as a damping object, it is possible to effectively reduce the vibration/noise of the compressor housing 20. In particular, the lid member 28 has a relatively small thickness relative to the other members forming the electric compressor 1, 1A, and is thus a major source where the vibration/noise is caused in the electric compressor 1, 1A.

With such configuration, since the first vibrator 104a is disposed on the lid member 28 causing the large vibration/noise, the vibration on the basis of the vibration signal is directly applied to the lid member 28, making it possible to effectively reduce the vibration/noise of the electric compressor 1, 1A.

Moreover, when disposed on the member such as the lid member 28 or the compressor housing 20 described above, the vibrator 104 is preferably disposed at a position of the member having large displacement. It is possible to confirm what kind of displacement occurs at each position of the electric compressor 1, 1A by a method such as electromagnetic field response analysis, hammering measurement, or eigenvalue analysis.

Moreover, it is preferable that eigenvalue analysis is performed on the electric compressor 1, 1A, and the vibrator 104 is disposed at a position of an antinode (position having maximum displacement) of the vibration in the vibration mode of the damping object. The position of the antinode of the vibration in the vibration mode of the damping object is a portion influenced the most by the vibration of the stator 14 and is, for example, an antinode 28a (a portion having the darkest color) of the lid member 28 if the fourth-order vibration mode shown in FIG. 7 is the damping object. With such configuration, it is possible to reduce the vibration/noise of the electric compressor 1, 1A more effectively.

In some embodiments, as shown in FIGS. 1 and 2, the first vibrator 104a is disposed in the inverter housing space 26, 26A. With such configuration, it is possible to protect the first vibrator 104a from external water, dirt, and the like. In addition, a space where the first vibrator 104a is disposed outside the electric compressor 1, 1A is no longer needed.

In some embodiments, as shown in FIGS. 1 and 2, the signal generator 102 is disposed in the inverter housing space 26, 26A. With such configuration, it is possible to protect the signal generator 102 from external water, dirt, and the like. In addition, it is possible to simplify wiring between the signal generator 102 and the first vibrator 104a.

In some embodiments, the detector 150 is configured to detect the frequency related to the vibration of the stator 14, based on the electrical frequency of the alternating current supplied to the stator 14.

In general, it is known that a synchronous speed (a rotation speed at which the stator 14 rotates the rotor 12) when the alternating current is supplied to the stator 14 is obtained by using:

$$N_S = \frac{120 \times f}{P} \quad (2)$$

where Ns is a rotation speed (rotation speed/min), f is the electrical frequency (Hz) of the alternating current supplied to the stator 14, and P is the number of poles of the stator 14. As described above, the vibration of the stator 14 is caused by the periodic change in magnetic attractive force associated with the rotation of the rotor 12. Thus, if the detector 150 detects the electrical frequency of the alternating current, the rotation speed Ns of the rotor 12 is calculated from the electrical frequency of the alternating current. Then, it is possible to calculate the electrical angle frequency ω from the rotation speed Ns of the rotor 12 by using:

$$\omega = \frac{2\pi \times P \times N_S}{120} \quad (3)$$

which is modified by substituting the electrical angle frequency ω/2π into the electrical frequency f of the alternating current in equation (2).

According to the findings of the present inventors, it is apparent that the stator 14 of the electric motor 10 vibrates at a frequency according to the electrical frequency of the alternating current supplied to the stator 14. Thus, with the configuration in which the detector 150 detects, based on the electrical frequency of the alternating current supplied to the stator 14, the frequency related to the vibration of the stator 14, the detector 150 can grasp the frequency related to the vibration of the stator 14 even before the vibration/noise arising from the vibration of the stator 14 is actually caused. Thus, it is possible to reduce the vibration/noise of the electric compressor 1, 1A more quickly than in a case where the vibration/noise arising from the vibration of the stator 14 is detected by using a vibration sensor 156 or a noise sensor 158 to be described later.

Figure 8A:
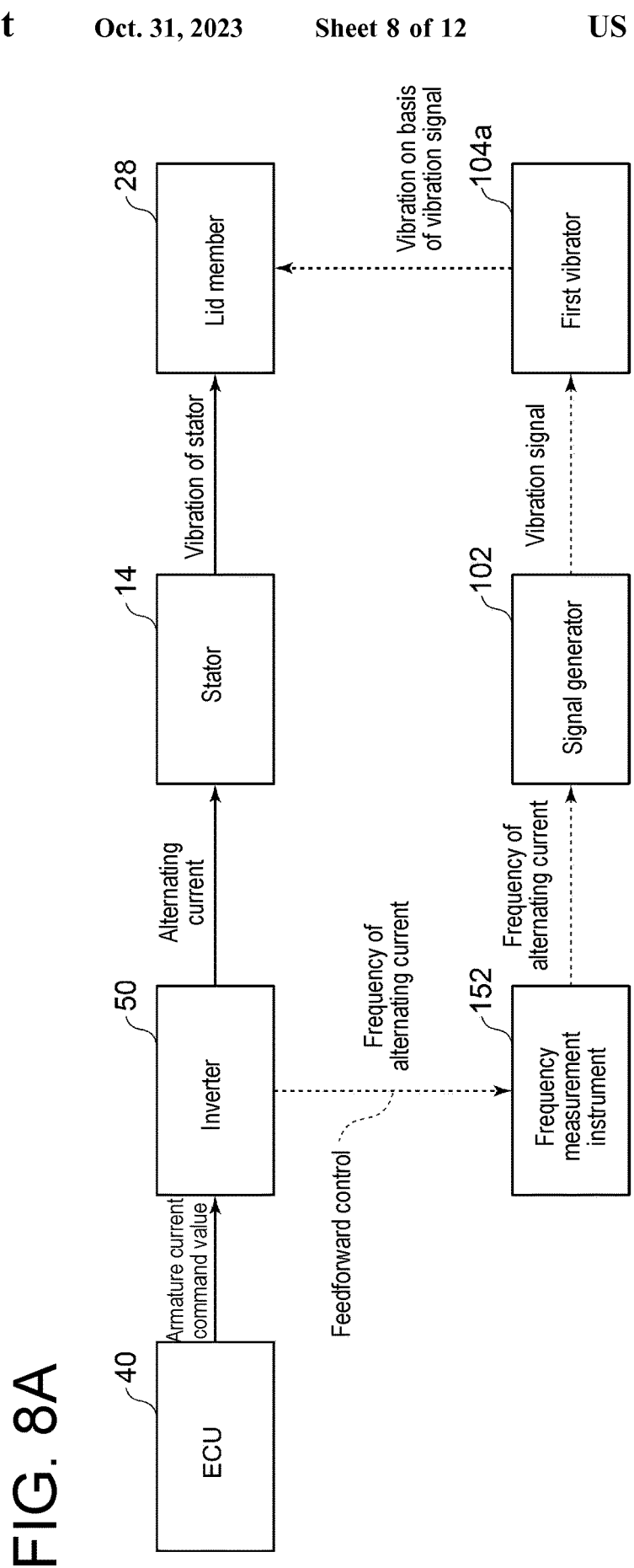
FIG. 8A is a functional block diagram for describing a flow in which a vibration/noise of the electric compressor is reduced by using a frequency measurement instrument according to an embodiment of the present invention.
Figure 8B:
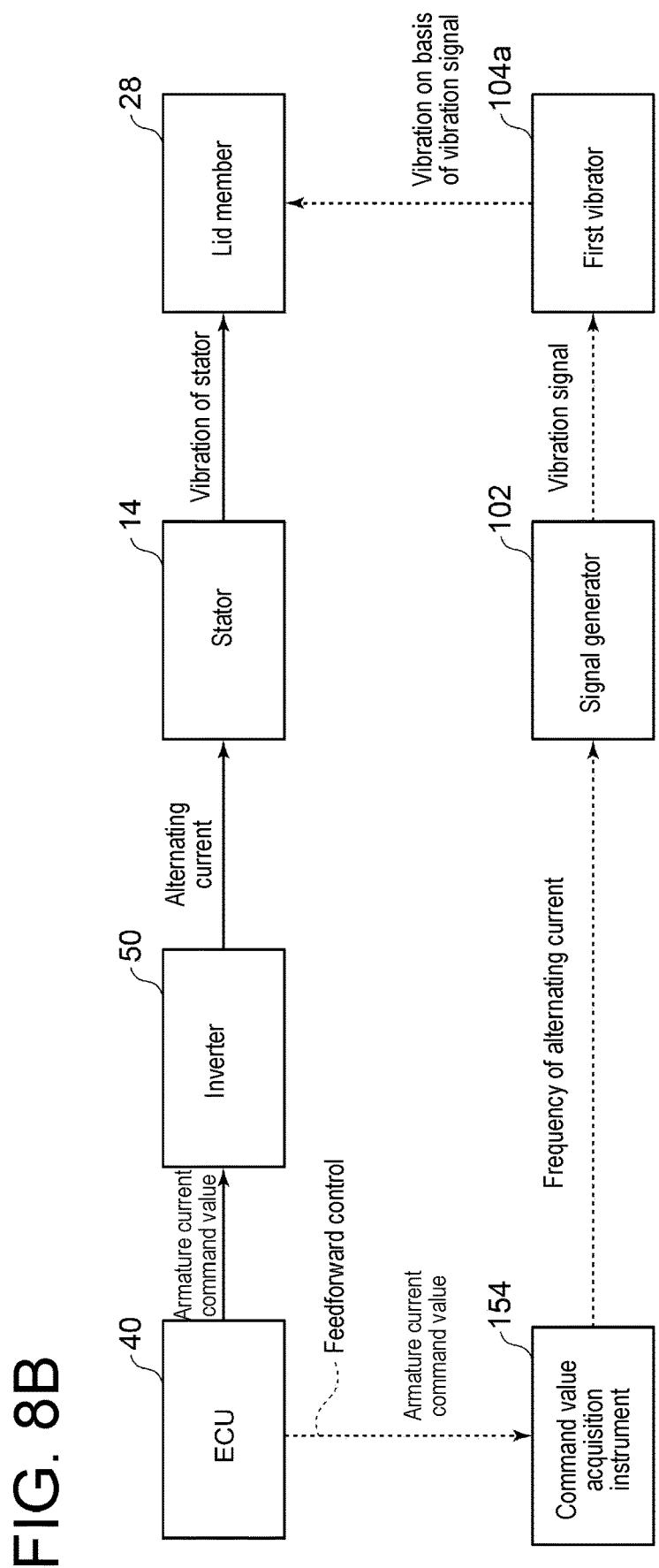
FIG. 8B is a functional block diagram for describing a flow in which the vibration/noise of the electric compressor is reduced by using a command value acquisition instrument according to an embodiment of the present invention.
Figure 8C:
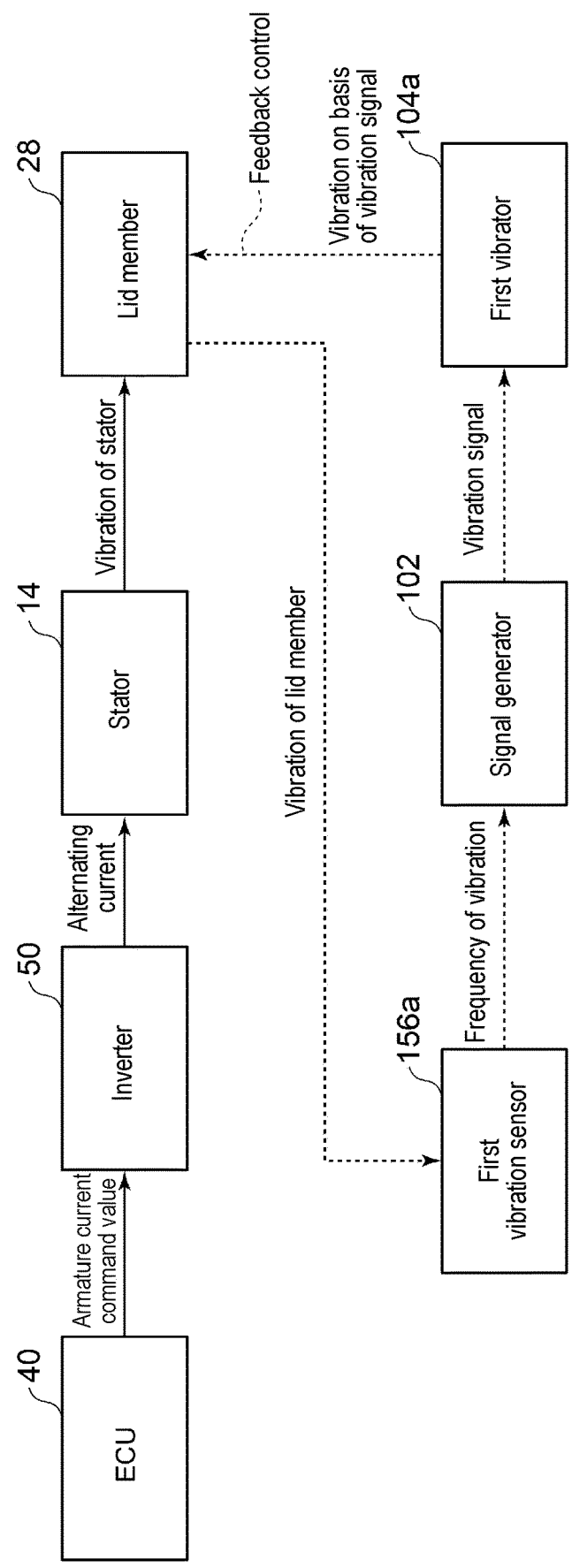
FIG. 8C is a functional block diagram for describing a flow in which the vibration/noise of the electric compressor is reduced by using a vibration sensor according to an embodiment of the present invention.
Figure 8D:
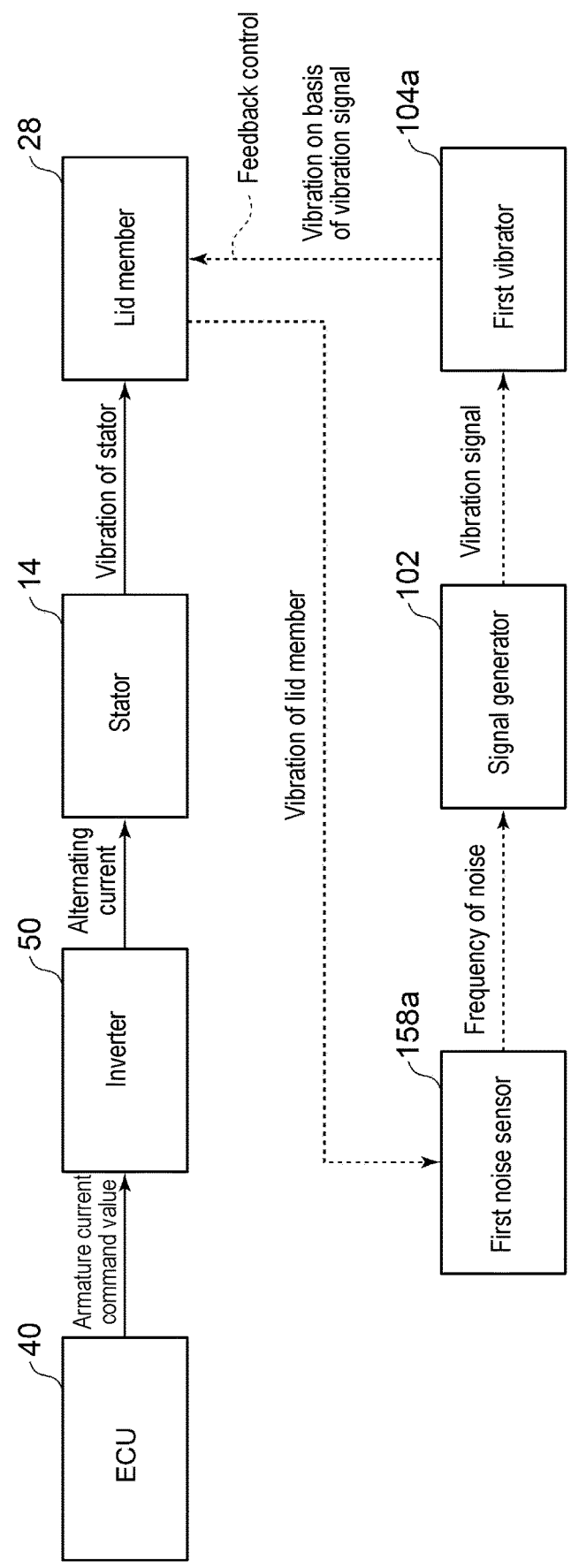
FIG. 8D is a functional block diagram for describing a flow in which the vibration/noise of the electric compressor is reduced by using a noise sensor according to an embodiment of the present invention.

Next, a flow in which the vibration/noise of the electric compressor is reduced will be described with reference to FIGS. 8A to 8D. FIG. 8A is a functional block diagram for describing a flow in which the vibration/noise of the electric compressor is reduced by using a frequency measurement instrument according to an embodiment of the present invention. FIG. 8B is a functional block diagram for describing a flow in which the vibration/noise of the electric compressor is reduced by using a command value acquisition instrument according to an embodiment of the present invention. FIG. 8C is a functional block diagram for describing a flow in which the vibration/noise of the electric compressor is reduced by using the vibration sensor according to an embodiment of the present invention. FIG. 8D is a functional block diagram for describing a flow in which the vibration/noise of the electric compressor is reduced by using the noise sensor according to an embodiment of the present invention. FIGS. 8A to 8D take, as an example, a case in which the vibration/noise of the lid member 28 of the electric compressor 1, 1A is reduced.

In some embodiments, the detector 150 is a frequency measurement instrument 152 for measuring the electrical frequency of the alternating current supplied to the stator 14. In the embodiments shown in FIGS. 1 and 2, respectively, the frequency measurement instrument 152 is disposed in the vicinity of the outlet of the inverter 50 and measures the electrical frequency of the alternating current immediately after being converted into the alternating current by the inverter 50.

As shown in FIG. 8A, the inverter 50 acquires an armature current command value output from the ECU 40, converts a direct current supplied from a battery (not shown) into an alternating current, and supplies the converted alternating current to the stator 14. Once the alternating current is supplied to the stator 14, the stator 14 is vibrated by the periodic change in magnetic attractive force associated with the rotation of the rotor 12. The vibration of the stator 14 is transmitted to the surroundings (such as the lid member 28) of the stator 14.

The frequency measurement instrument 152 measures the electrical frequency of the alternating current supplied to the stator 14. The signal generator 102 generates the vibration signal based on the electrical angle frequency ω which is obtained by performing a predetermined process (such as Fourier transform) on a measurement value of the electrical frequency of the alternating current measured by the frequency measurement instrument 152. The first vibrator 104a vibrates the lid member 28 based on the vibration signal generated by the signal generator 102.

With such configuration, the frequency measurement instrument 152 detects the frequency related to the vibration of the stator 14, based on the electrical frequency of the alternating current supplied to the stator 14. Thus, it is possible to grasp the frequency related to the vibration of the stator 14 even before the vibration/noise arising from the vibration of the stator 14 is actually caused (feedforward control). Moreover, since the lid member 28 (electric compressor 1, 1A) is vibrated based on the vibration signal which is generated from the measurement value of the electrical frequency of the alternating current supplied to the stator 14, it is possible to reduce the vibration/noise of the electric compressor 1, 1A arising from the vibration of the stator 14.

In some embodiments, the detector 150 is a command value acquisition instrument 154 disposed in the inverter 50, for acquiring a command value (armature current command value) regarding the electrical frequency of the alternating current input to the inverter 50.

As shown in FIG. 8B, the command value acquisition instrument 154 acquires the armature current command value output from the ECU 40 and calculates the frequency of the alternating current from the armature current command value. The signal generator 102 generates the vibration signal based on the electrical angle frequency ω which is obtained by performing the predetermined process (equation (2)) on the electrical frequency of the alternating current calculated by the command value acquisition instrument 154. The first vibrator 104a vibrates the lid member 28 based on the vibration signal generated by the signal generator 102. The flow until the vibration of the stator 14 is transmitted to the lid member 28 by the armature current command value output from the ECU 40 is in common with the flow shown in FIG. 8A, and thus a description thereof will be omitted.

With such configuration, the command value acquisition instrument 154 detects the frequency related to the vibration of the stator 14, based on the electrical frequency of the alternating current supplied to the stator 14. Thus, it is possible to grasp the frequency related to the vibration of the stator 14 even before the vibration/noise arising from the vibration of the stator 14 is actually caused (feedforward control). Moreover, acquiring the armature current command value output from the ECU 40, it is possible to detect the frequency related to the vibration of the stator 14 even before the alternating current is generated in accordance with the armature current command value in the inverter 50. Therefore, it is possible to quickly detect the frequency related to the vibration of the stator 14, compared to the case in which the frequency measurement instrument 152 is used.

In some embodiments, the detector 150 is the vibration sensor 156 configured to detect the frequency of the vibration of the electric compressor 1, 1A. In the embodiments shown in FIGS. 1 and 2, respectively, the vibration sensor 156 includes a first vibration sensor 156a disposed to be in contact with the lid member 28 in the inverter housing space 26, 26A. The first vibration sensor 156a may be disposed adjacent to the first vibrator 104a in order to detect the vibration of the lid member 28 having been vibrated by the first vibrator 104a.

As shown in FIG. 8C, the signal generator 102 generates the vibration signal on the basis of the electrical angle frequency ω which is obtained by performing the predetermined process, such as Fourier transform, on the frequency of the vibration of the lid member 28 detected by the first vibration sensor 156a. The first vibrator 104a vibrates the lid member 28 based on the vibration signal generated by the signal generator 102. The flow until the vibration of the stator 14 is transmitted to the lid member 28 by the armature current command value output from the ECU 40 is in common with the flow shown in FIG. 8A, and thus a description thereof will be omitted.

With such configuration, since the first vibrator 104a vibrates the lid member 28 so as to cancel the vibration of the lid member 28 detected by the first vibration sensor 156a, it is possible to reduce the vibration/noise of the electric compressor 1, 1A (feedback control).

In some embodiments, the detector 150 is the noise sensor 158 configured to detect the frequency of the noise caused by the electric compressor 1, 1A. In the embodiments shown in FIGS. 1 and 2, respectively, the noise sensor 158 includes a first noise sensor 158a disposed on the lid member 28 in the inverter housing space 26, 26A.

As shown in FIG. 8D, the signal generator 102 generates the vibration signal on the basis of the electrical angle frequency ω which is obtained by performing the predetermined process, such as Fourier transform, on the frequency of the noise of the lid member 28 detected by the first noise sensor 158a. The first vibrator 104a vibrates the lid member 28 based on the vibration signal generated by the signal generator 102. The flow until the vibration of the stator 14 is transmitted to the lid member 28 by the armature current command value output from the ECU 40 is in common with the flow shown in FIG. 8A, and thus a description thereof will be omitted.

With such configuration, since the first vibrator 104a vibrates the lid member 28 so as to cancel the noise of the lid member 28 detected by the first noise sensor 158a, it is possible to reduce the vibration/noise of the electric compressor 1, 1A (feedback control).

In some embodiments, as shown in FIGS. 1 and 2, the vibrator 104 includes the second vibrator 104b disposed on the compressor housing 20. In the embodiments shown in FIGS. 1 and 2, respectively, the second vibrator 104b is disposed outside the electric compressor 1, 1A. With such configuration, it is possible to directly apply the vibration on the basis of the vibration signal to the compressor housing 20, and to reduce the vibration/noise of the electric compressor 1, 1A.

In some embodiments, as shown in FIGS. 1 and 2, the vibration sensor 156 includes a second vibration sensor 156b disposed outside the electric compressor 1, 1A and is disposed to be in contact with the compressor housing 20. With such configuration, the vibration signal for canceling the vibration of the compressor housing 20 is generated by the signal generator 102, and the vibration on the basis of the vibration signal is applied to the compressor housing 20 by the vibrator 104 (second vibrator 104b). Thus, it is possible to reduce the vibration/noise of the electric compressor 1, 1A. The second vibration sensor 156b may be disposed adjacent to the second vibrator 104b in order to detect the vibration of the compressor housing 20 having been vibrated by the second vibrator 104b.

In some embodiments, as shown in FIGS. 1 and 2, the noise sensor 158 includes a second noise sensor 158b disposed outside the electric compressor 1, 1A and is disposed in the vicinity of the lid member 28 to be able to detect the noise caused from the lid member 28. In addition, the noise sensor 158 includes a third noise sensor 158c disposed outside the electric compressor 1, 1A and is disposed in the vicinity of the compressor housing 20 to be able to detect the noise caused from the compressor housing.

With the configuration in which the noise sensor 158 includes the second noise sensor 158b, the vibration signal for canceling the noise of the lid member 28 is generated by the signal generator 102, and the vibration on the basis of the vibration signal is applied to the lid member 28 by the vibrator 104 (first vibrator 104a). Thus, it is possible to reduce the vibration/noise of the electric compressor 1, 1A. Moreover, with such configuration in which the noise sensor 158 includes the third noise sensor 158c, the vibration signal for canceling the noise of the compressor housing 20 is generated by the signal generator 102, and the vibration on the basis of the vibration signal is applied to the compressor housing 20 by the vibrator 104 (second vibrator 104b). Thus, it is possible to reduce the vibration/noise of the electric compressor 1, 1A.

In the embodiments shown in FIGS. 1 and 2, respectively, the electric compressor 1, 1A includes the four detectors 150 (frequency measurement instrument 152, command value acquisition instrument 154, vibration sensor 156, noise sensor 158). However, the present invention is not limited to such embodiment and, for example, the electric compressor 1, 1A may be configured to include only the frequency measurement instrument 152 or may be configured to include the command value acquisition instrument 154 and the vibration sensor 156. Further, although the description has been given by taking the case in which the electric motor 10 has four poles as the example, the present invention is not limited to such embodiment and, for example, the electric motor 10 may have two poles or six poles.

Moreover, an elastic member (not shown) may be disposed between the electric motor 10 and the motor housing 18 (that is, the stator 14 and the motor housing 18 may not directly be in contact). In this case, it is possible to reduce a thickness relative to the elastic member (damping member) disposed in the conventional electric compressor 1, 1A. Accordingly, it is possible to increase the capacity of the heat generated by the stator 14 to be transmitted to the motor housing 18, and to reduce the vibration/noise of the electric compressor 1, 1A without impairing coolability of the stator 14.

<Vibration/Noise Reduction Method>

Figure 9:
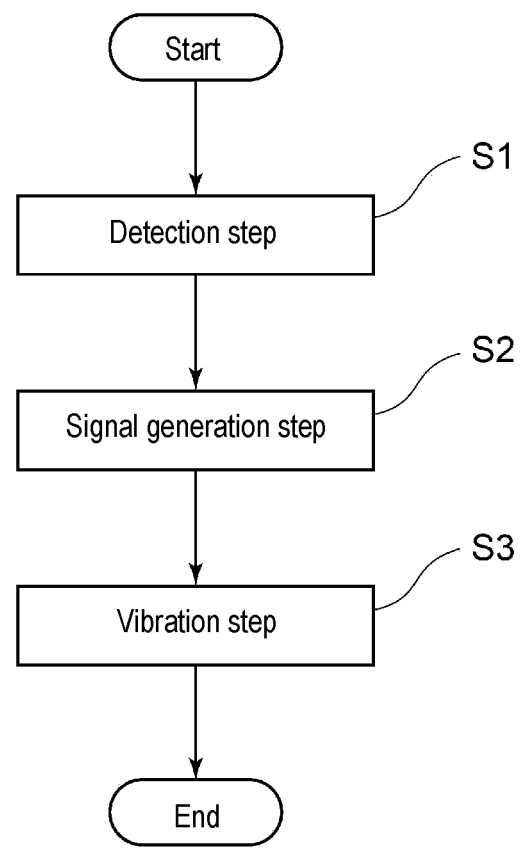
FIG. 9 is a flowchart of a vibration/noise reduction method according to an embodiment of the present invention.

Next, a vibration/noise reduction method according to an embodiment of the present invention will be described with reference to FIG. 9. FIG. 9 is a flowchart of the vibration/noise reduction method according to an embodiment of the present invention.

As shown in FIG. 9, the vibration/noise reduction method according to an embodiment of the present invention includes a step (detection step S1) of detecting the frequency related to the vibration of the stator 14, a step (signal generation step S2) of generating the vibration signal that has the frequency of the predetermined integral multiple of the electrical angle frequency ω obtained from the frequency and has the signal wave attenuating the vibration of the stator 14, and a step (vibration step S3) of vibrating the electric compressor 1, 1A based on the vibration signal.

With such vibration/noise reduction method, the electric compressor 1, 1A is applied with the vibration on the basis of the vibration signal that is the predetermined integral multiple of the electrical angle frequency ω, which is obtained from the frequency related to the vibration of the stator 14, and has the signal wave attenuating the vibration of the stator 14. Thus, it is possible to cancel the vibration/noise arising from the vibration of the stator 14 by the vibration on the basis of the vibration signal, and to reduce the vibration/noise of the electric compressor 1, 1A. Therefore, it is no longer necessary to dispose the damping member for suppressing the vibration of the stator 14 of the electric motor 10 between the stator 14 and the motor housing 18 as before, or it is possible to reduce the thickness of the damping member to increase the capacity of the heat generated by the stator 14 to be transmitted to the motor housing 18. Accordingly, it is possible to reduce the vibration/noise of the electric compressor 1, 1A without impairing coolability of the stator 14.

In some embodiments, the detection step S1 includes detecting the frequency related to the vibration of the stator 14, based on the electrical frequency of the alternating current supplied to the stator 14.

With such vibration/noise reduction method, since the frequency related to the vibration of the stator 14 is detected based on the electrical frequency of the alternating current supplied to the stator 14, it is possible to perform so-called feedforward control, and to grasp the frequency related to the vibration of the stator 14 even before the vibration/noise arising from the vibration of the stator 14 is caused.

In some embodiments, the detection step S1 includes detecting the frequency related to the vibration of the stator 14 by detecting the frequency of the vibration of the electric compressor 1, 1A or detecting the frequency of the noise caused by the electric compressor 1, 1A.

With such vibration/noise reduction method, the frequency related to the vibration of the stator 14 is detected from the frequency of the vibration or the frequency of the noise of the electric compressor 1, 1A, making it possible to reduce the vibration/noise of the electric compressor 1, 1A which is actually caused.

In some embodiments, the magnitude of the vibration (vibration force F) (the magnitude of the gain G described above) applied to the electric compressor 1, 1A may be adjusted in accordance with the magnitude of the vibration of the stator 14 which is predicted from a current value of the alternating current supplied to the stator 14. Thus, it is possible to decide, in a feedforward manner, the magnitude of the vibration force F suitable for canceling the vibration of the electric compressor 1, 1A, in accordance with an operating state of the electric compressor 1, 1A. The current value of the alternating current supplied to the stator 14 can be grasped from the armature current command value output from the ECU 40 or a current value of the alternating current converted by the inverter 50.

In some embodiments, the magnitude of the vibration (vibration force F) (the magnitude of the gain G described above) applied to the electric compressor 1, 1A may be adjusted by inputting a target vibration value, which is preset to be able to cancel the vibration/noise caused from the electric compressor 1, 1A in a possible operation condition, to the signal generator 102, and detecting a difference between the target vibration value and the vibration of the electric compressor 1, 1A measured by the vibration sensor 156. Likewise, the magnitude of the vibration (vibration force F) (the magnitude of the gain G described above) applied to the electric compressor 1, 1A may be adjusted by inputting a target noise value, which is preset to be able to cancel the vibration/noise caused from the electric compressor 1, 1A in the possible operation condition, to the signal generator 102, and detecting a difference between the target noise value and the noise of the electric compressor 1, 1A measured by the noise sensor 158. Thus, it is possible to decide, in a feedback manner, the magnitude of the vibration force F suitable for canceling the vibration/noise of the electric compressor 1, 1A, in accordance with a change in operating state of the electric compressor 1, 1A.

The vibration/noise reduction device, the electric compressor including the vibration/noise reduction device, and the vibration/noise reduction method according to an embodiment of the present invention have been described above. However, the present invention is not limited the above-described form, and various modifications can be made within a range without departing from the object of the present invention.

REFERENCE SIGNS LIST 1, 1A Electric compressor
2 Rotational shaft
3 Bearing
4 Compressor wheel
10 Electric motor
12 Rotor
14 Stator
15 Cooling passage
16 Stator coil
17 Motor housing space
18 Motor housing
20 Compressor housing
22 Nut
24 Precompression application member
26, 26A Inverter housing space
28 Lid member
30 Elastic member
32 Inverter housing
50 Inverter
100 Vibration/noise reduction device
102 Signal generator
104 Vibrator
150 Detector
152 Frequency measurement instrument
154 Command value acquisition instrument
156 Vibration sensor
158 Noise sensor S1 Detection step
S2 Signal generation step
S3 Vibration step

The invention claimed is:

1. A vibration/noise reduction device for reducing a vibration or noise of an electric compressor,
the electric compressor including:
a rotational shaft;
a compressor wheel disposed on the rotational shaft; and
an electric motor for applying a rotational force to the rotational shaft, the electric motor including:
a rotor fixed to the rotational shaft; and
a stator disposed around the rotor, for applying the rotational force to the rotor by an electromagnetic force,
the vibration/noise reduction device comprising:
a detector for detecting a frequency related to a vibration of the stator;
a signal generator for generating a vibration signal that has a frequency of a predetermined integral multiple of an electrical angle frequency, which is obtained from the frequency detected by the detector, and has a signal wave attenuating the vibration of the stator, and
a vibrator configured to vibrate the electric compressor based on the vibration signal,
wherein the electric compressor further includes:
a motor housing for housing the electric motor; and
an inverter for controlling an electrical frequency of an alternating current supplied to the stator,
wherein the inverter is housed in an inverter housing space formed inside the motor housing, the inverter housing space disposed on an opposite side of the compressor wheel across the electric motor,
wherein the electric compressor further includes a lid member for covering an opening of the inverter housing space, and
wherein the vibrator is disposed on the lid member.

2. The vibration/noise reduction device according to claim 1,
wherein the vibrator is disposed in the inverter housing space.

3. The vibration/noise reduction device according to claim 1,
wherein the signal generator is disposed in the inverter housing space where the inverter is housed.

4. The vibration/noise reduction device according to claim 1, wherein the detector is configured to detect the frequency related to the vibration of the stator, based on the electrical frequency of the alternating current supplied to the stator.

5. The vibration/noise reduction device according to claim 4,
wherein the detector includes a frequency measurement instrument for measuring the electrical frequency of the alternating current supplied to the stator.

6. The vibration/noise reduction device according to claim 4,
wherein the detector includes a command value acquisition instrument for acquiring a command value regarding the electrical frequency of the alternating current input to the inverter.

7. The vibration/noise reduction device according to claim 1,
wherein the detector includes a vibration sensor configured to detect a frequency of a vibration of the electric compressor.

8. The vibration/noise reduction device according to claim 1,
wherein the detector includes a noise sensor configured to detect a frequency of noise caused by the electric compressor.

9. The vibration/noise reduction device according to claim 1,
wherein the vibration signal has a signal wave which is an opposite phase to the vibration of the stator.

10. A vibration/noise reduction method for reducing a vibration or noise of an electric compressor,
the electric compressor including:
a rotational shaft;
a compressor wheel disposed on the rotational shaft;
an electric motor for applying a rotational force to the rotational shaft, the electric motor including:
a rotor fixed to the rotational shaft;
a stator disposed around the rotor, for applying the rotational force to the rotor by an electromagnetic force, and
a vibrator configured to vibrate the electric compressor based on the vibration signal,
wherein the electric compressor further includes:
a motor housing for housing the electric motor; and
an inverter for controlling an electrical frequency of an alternating current supplied to the stator,
wherein the inverter is housed in an inverter housing space formed inside the motor housing, the inverter housing space disposed on an opposite side of the compressor wheel across the electric motor,
wherein the electric compressor further includes a lid member for covering an opening of the inverter housing space, and
wherein the vibrator is disposed on the lid member,
the vibration/noise reduction method comprising:
a step of detecting a frequency related to a vibration of the stator;
a step of generating a vibration signal that has a frequency of a predetermined integral multiple of an electrical angle frequency obtained from the frequency and has a signal wave attenuating the vibration of the stator; and
a step of vibrating the electric compressor based on the vibration signal.

11. The vibration/noise reduction method according to claim 10,
wherein the step of detecting the frequency includes detecting the frequency based on an electrical frequency of an alternating current supplied to the stator.

* * * * *